US009898396B2

(12) United States Patent
Owen et al.

(10) Patent No.: US 9,898,396 B2
(45) Date of Patent: Feb. 20, 2018

(54) AUTOMATED SOFTWARE TESTING AND VALIDATION VIA GRAPHICAL USER INTERFACE

(71) Applicant: TRYON SOLUTIONS, INC., Raleigh, NC (US)

(72) Inventors: Josh Owen, St. Petersburg, FL (US); Kevin Myers, Raleigh, NC (US); Jeff Williams, Raleigh, NC (US)

(73) Assignee: Tryon Solutions, Inc., Raleigh, NC (US)

( * ) Notice: Subject to any disclaimer, the term of this patent is extended or adjusted under 35 U.S.C. 154(b) by 0 days.

(21) Appl. No.: 14/976,933

(22) Filed: Dec. 21, 2015

(65) Prior Publication Data
US 2017/0177466 A1 Jun. 22, 2017

(51) Int. Cl.
G06F 9/44 (2006.01)
G06F 11/36 (2006.01)

(52) U.S. Cl.
CPC .............. G06F 11/3688 (2013.01)

(58) Field of Classification Search
CPC .............................................. G06F 11/3688
USPC ................. 717/120–129, 138–141
See application file for complete search history.

(56) References Cited

U.S. PATENT DOCUMENTS

| 5,905,856 A * | 5/1999 | Ottensooser | G06F 11/3688 714/38.1 |
| 6,412,106 B1 * | 6/2002 | Leask | G06F 11/3664 714/E11.217 |
| 7,181,382 B2 * | 2/2007 | Shier | G06F 11/2273 702/182 |
| 7,464,372 B2 * | 12/2008 | Achlioptas | G06F 11/3688 714/E11.208 |
| 7,596,778 B2 * | 9/2009 | Kolawa | G06F 11/3688 714/38.14 |
| 7,721,154 B1 * | 5/2010 | Jaamour | G06F 11/3624 714/38.14 |
| 7,730,452 B1 * | 6/2010 | Li | G06F 9/443 717/124 |
| 7,735,066 B1 * | 6/2010 | Myers | G06F 11/3612 717/125 |

(Continued)

OTHER PUBLICATIONS

Vasar et al, "Framework for Monitoring and Testing Web Application Scalability on the Cloud", ACM, pp. 53-60, 2012.*

(Continued)

Primary Examiner — Anil Khatri
(74) Attorney, Agent, or Firm — Joshua L. Price

(57) ABSTRACT

A system for testing a computing device, the system comprising: a display; a testing application maintained on a storage device; and a controller that is capable of controlling to execute the testing application to test the computing device. The controller comprises a microprocessor, wherein the controller is in operable communication with the computing device and the display. The controller controls to: execute one or more testing scenarios; emulate a performance of work by a plurality of virtual work-performing devices based on the one or more testing scenarios. Each of the virtual work-performing devices applies a load onto the computing device; and provide, via the display, a visual representation of each of the plurality of virtual work-performing devices during the testing of the computing device.

8 Claims, 13 Drawing Sheets

(56) References Cited

U.S. PATENT DOCUMENTS

| | | | |
|---|---|---|---|
| 7,770,159 B2* | 8/2010 | Pepin | G06F 9/4435 717/138 |
| 7,788,642 B2* | 8/2010 | Sohm | G06F 12/0804 711/122 |
| 7,950,004 B2* | 5/2011 | Vieira | G06F 11/3688 714/25 |
| 7,962,620 B2* | 6/2011 | Safari | G06F 11/1433 709/223 |
| 8,271,964 B2* | 9/2012 | Zorn | G06F 8/20 717/140 |
| 8,336,029 B1* | 12/2012 | McFadden | G06F 9/45516 717/100 |
| 8,387,015 B2* | 2/2013 | Christensen | G06F 11/3668 717/124 |
| 8,418,000 B1* | 4/2013 | Salame | G06F 11/079 714/26 |
| 8,429,618 B2* | 4/2013 | Hogan | G06F 11/3688 717/124 |
| 8,464,224 B2 | 6/2013 | Dulip et al. | |
| 8,468,502 B2* | 6/2013 | Lui | G06F 11/3612 717/125 |
| 8,489,648 B1* | 7/2013 | Rubin | G06F 8/20 707/802 |
| 8,589,886 B2* | 11/2013 | Lavie | G06F 11/263 702/108 |
| 8,612,947 B2* | 12/2013 | LeRoux | G06F 8/71 717/137 |
| 8,640,106 B2* | 1/2014 | Weigert | G06F 8/10 717/126 |
| 8,711,159 B2* | 4/2014 | Li | G06T 1/20 345/522 |
| 8,788,885 B1 | 7/2014 | Cook et al. | |
| 8,799,866 B2* | 8/2014 | Bullard | G06F 3/048 717/125 |
| 8,943,423 B2* | 1/2015 | Merrill | G06F 8/34 715/700 |
| 8,949,794 B2* | 2/2015 | Tempel | G06F 11/3664 715/234 |
| 8,954,933 B2* | 2/2015 | Bullard | G06F 11/368 717/125 |
| 9,069,647 B2* | 6/2015 | Bertram | G06F 8/73 |
| 9,436,589 B2* | 9/2016 | Li | G06F 8/443 |
| 9,703,691 B1* | 7/2017 | Yim | G06F 11/3688 |

OTHER PUBLICATIONS

Hierons et al, "Using Formal Specifications to Support Testing", ACM Computing Surveys, vol. 41, No. 2, Article 9, pp. 1-76 2009.*

Santelices et al, "Efficiently Monitoring Data-Flow Test Coverage". ACM, pp. 343-352, 2007.*

Liu et al, "A Domain-Specific Visual Modeling Language for Testing Environment Emulation", IEEE, pp. 143-151, 2016.*

Boncalo et al, "Cost effective FPGA probabilistic fault emulation", IEEE, pp. 1-4, 2014.*

Landhaußer et al, "Automated Test-Case Generation by Cloning", IEEE, pp. 83-88, 2012.*

Shye et al, "Code Coverage Testing Using Hardware Performance Monitoring Support", ACM, pp. 159-163, 2005.*

Kiviluoma et al, "Run-Time Monitoring of Architecturally Significant Behaviors Using Behavioral Profiles and Aspects", ACM, pp. 181-190, 2006.*

Ringenburg et al, "Monitoring and Debugging the Quality of Results in Approximate Programs", ACM, pp. 399-411, 2015.*

* cited by examiner

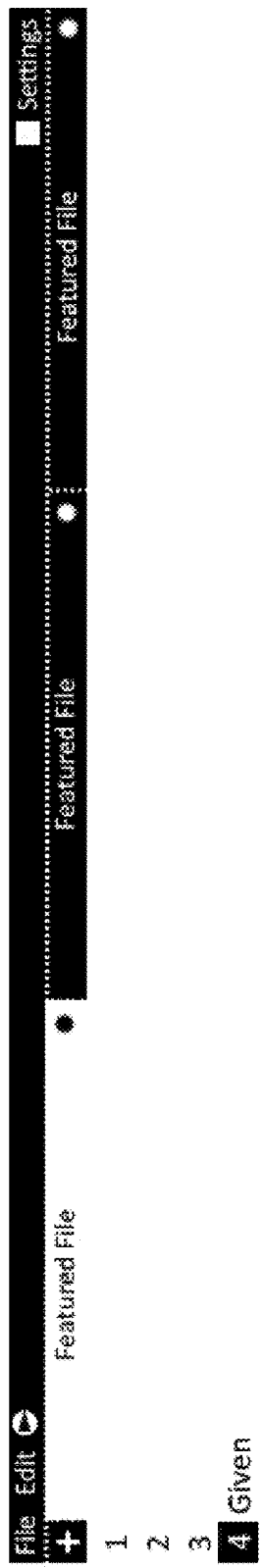
FIG. 10
FIG. 11

AUTOMATED SOFTWARE TESTING AND VALIDATION VIA GRAPHICAL USER INTERFACE

BACKGROUND

In software development, a significant amount of testing and related reporting is required throughout each of the stages of software product's development and continued use. Current software testing allows for the testing of software through the stages of development including the initial coding, debugging and modifications to improve performance of the code for the software, release, and further modifications necessary to customize to systems of the end users. These are merely high level summarizations of some of the phases of software development and these stages, as well as any of the other stages of software development, often include a number sub-stages of software development that also require suitable testing to ensure proper operability.

In any case, current methods of software testing may require great amounts of technical resources, such as software engineers and software coders, with the ability to prepare testing scenarios in one or more complicated software coding languages. Because many of the testing scenarios may be written in varying forms of software coding languages, it can be difficult for a non-technical resource to evaluate the efficacy or usefulness of testing scenarios or even prepare a testing scenario for lack of competencies in the software coding languages of the testing scenarios.

Therefore, there is a need for system for addressing these deficiencies.

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is present later.

Embodiments of the present invention are directed to systems, methods, apparatus, and computer program products for providing natural language testing scenarios for testing software.

In one embodiment, the invention comprises: (a) a terminal comprising a display, wherein the display is configured to display a graphical user interface comprising one or more portions for receiving input; (b) a receiving unit that receives via the graphical user interface, input of natural language description that defines one or more steps in a natural language testing scenario for testing one or more target software applications; and (c) a controller, by executing the natural language description of the natural language testing scenario, applies the natural language testing scenario to the one or more target software applications.

In another embodiment, the invention further comprises a storage device having stored thereon one or more predefined testing scenarios comprising natural language descriptions for testing the one or more target applications.

In yet another embodiment of the invention, in response to executing by the controller the natural language description defining the one or more steps, the controller controls the display to display an emulation of an operation of the one or more target software applications based on the defined one or more steps.

In some embodiments of the present invention, the receiving unit is configured to receive input of one or more logical control structures for the natural language testing scenario, and wherein the controller, by executing both (i) the logical control structures and (ii) the natural language description, applies the natural language testing scenario to the one or more target software applications.

In one embodiment of the invention, the input of natural language description defines a plurality of steps in the natural language testing scenario, and wherein the receiving unit receives input of a timing delay for delaying an execution by the controller of a successive step in the plurality of steps in the natural language testing scenario, such that between an n step and an n+1 step, the n+1 step is executed by the controller only after a time period associated with the input of the timing delay has expired.

In one embodiment of the present invention, the controller is configured to cause the display to display (i) a results portion on the graphical interface that includes the natural language description that is being executed or that has been executed and (ii) a modification of an appearance of the natural language description that failed to execute properly or caused an error during execution by the controller, wherein the failing natural language description is modified to appear different from the natural language description that did not fail.

In some embodiments of the present invention, one of the one or more steps defined by the input of natural language description of the testing scenario comprising an image comparison step, wherein upon execution of the image comparison step by the controller, the controller compares a stored image to the graphical user interface or another image to determine whether the stored image matches to an image on the graphical user interface or matches the another image.

In another embodiment of the invention, the controller performs a pixel-by-pixel comparison of the stored image and the image on the graphical user interface or the another image during the execution of the test scenario, and wherein the receiving unit is configured to receive input of a tolerance threshold for performing determining a match of images that can be increased or decreased.

In one embodiment, the invention further comprises a report generator that generates, in either in response to a completion or termination of the testing or in response to a request for a report, the report comprises information relating to the testing of the target software application.

In some embodiments, the invention comprises: (a) a receiving device that receives controller-executable instructions provided in natural language that define an evaluation scenario for evaluating target software; and (b) a controller, by executing the controller-executable instructions written in natural language, applies the evaluation scenario to the target software.

As another example embodiment of the invention, the invention comprises a computer-implemented method for implementing the steps of: (a) receiving input of controller-executable instructions provided in natural language that define a test scenario for testing a target software; and (b) executing, by a controller, the controller-executable instructions provided in natural language to apply the test scenario to the target software.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
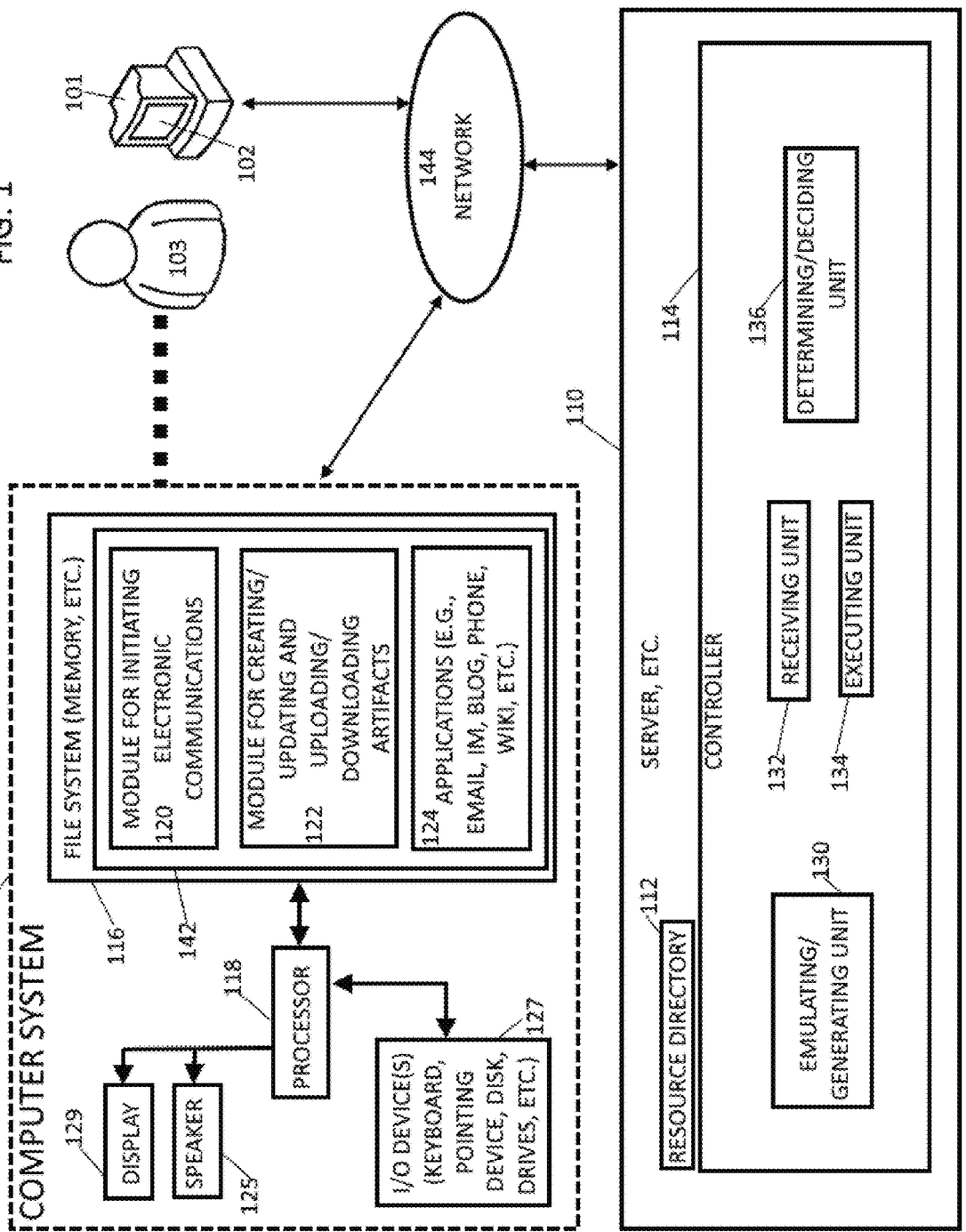
Figure 2:
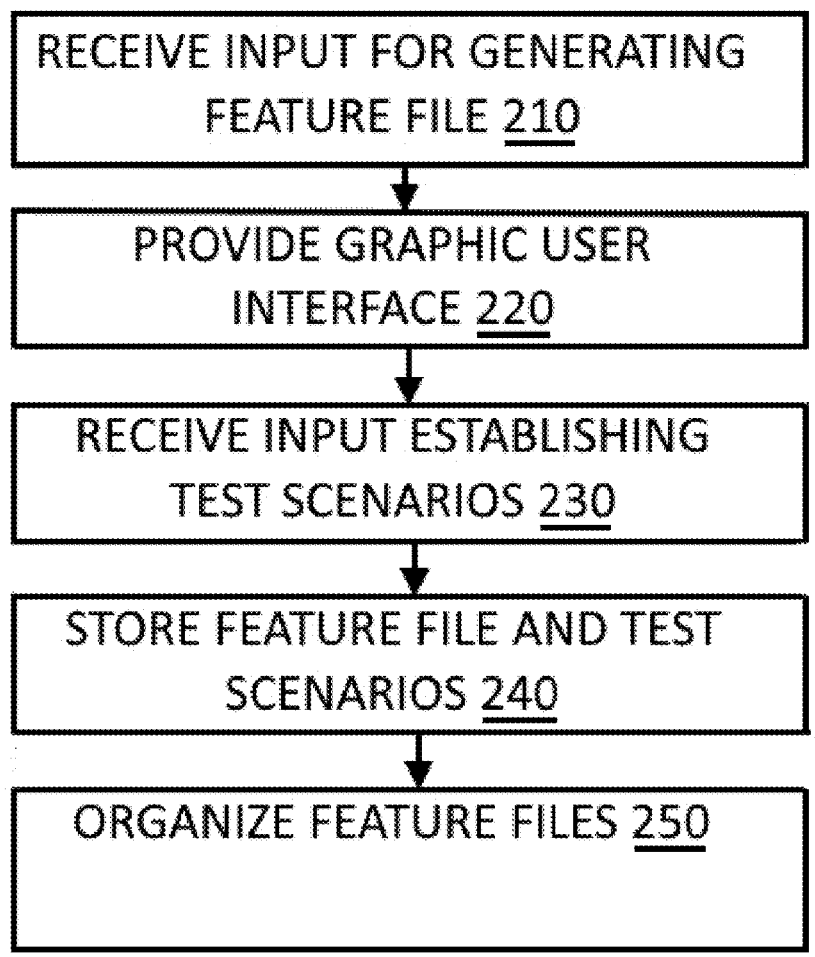
Figure 3:
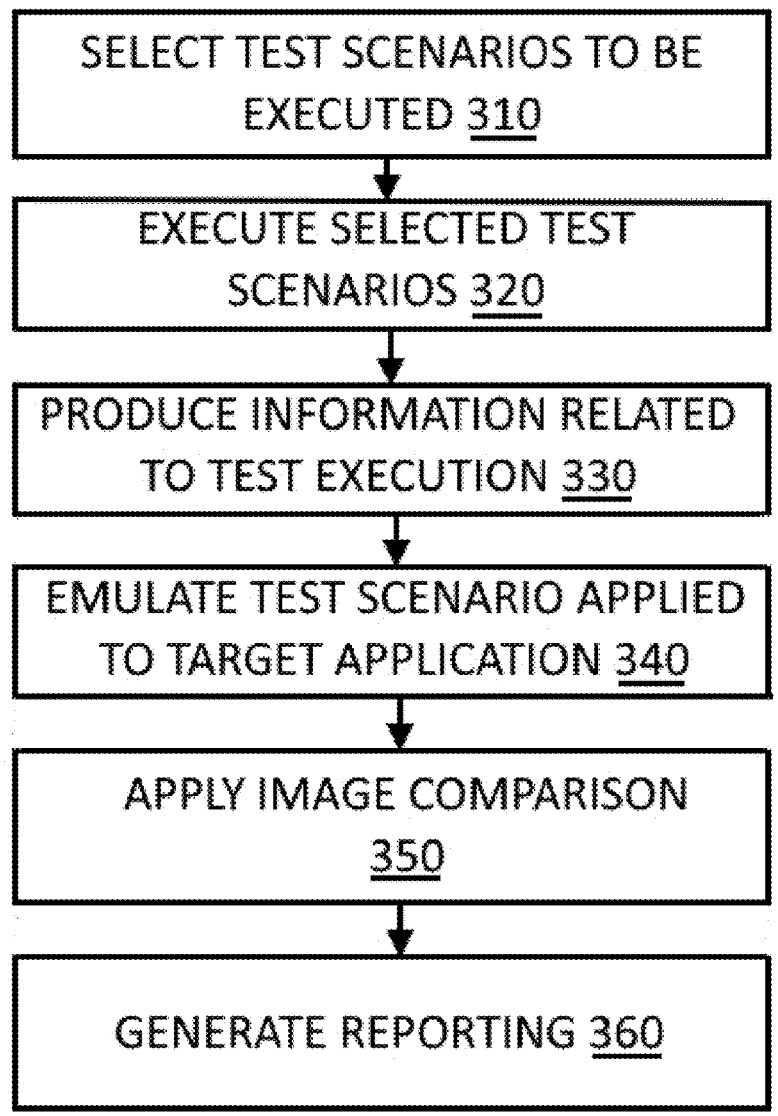
Figure 4:
Figure 5:
Figure 6:
Figure 6A:
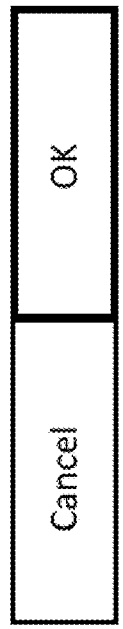
Figure 6B:
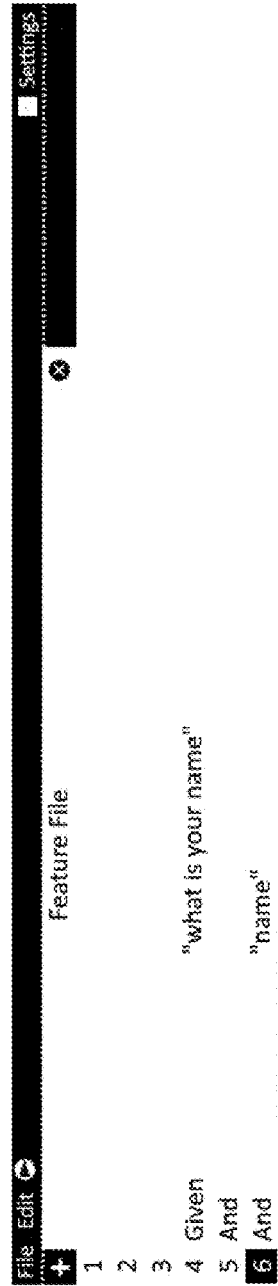
Figure 7:
Figure 8:
Figure 8A:
Figure 9:
Figure 9A:
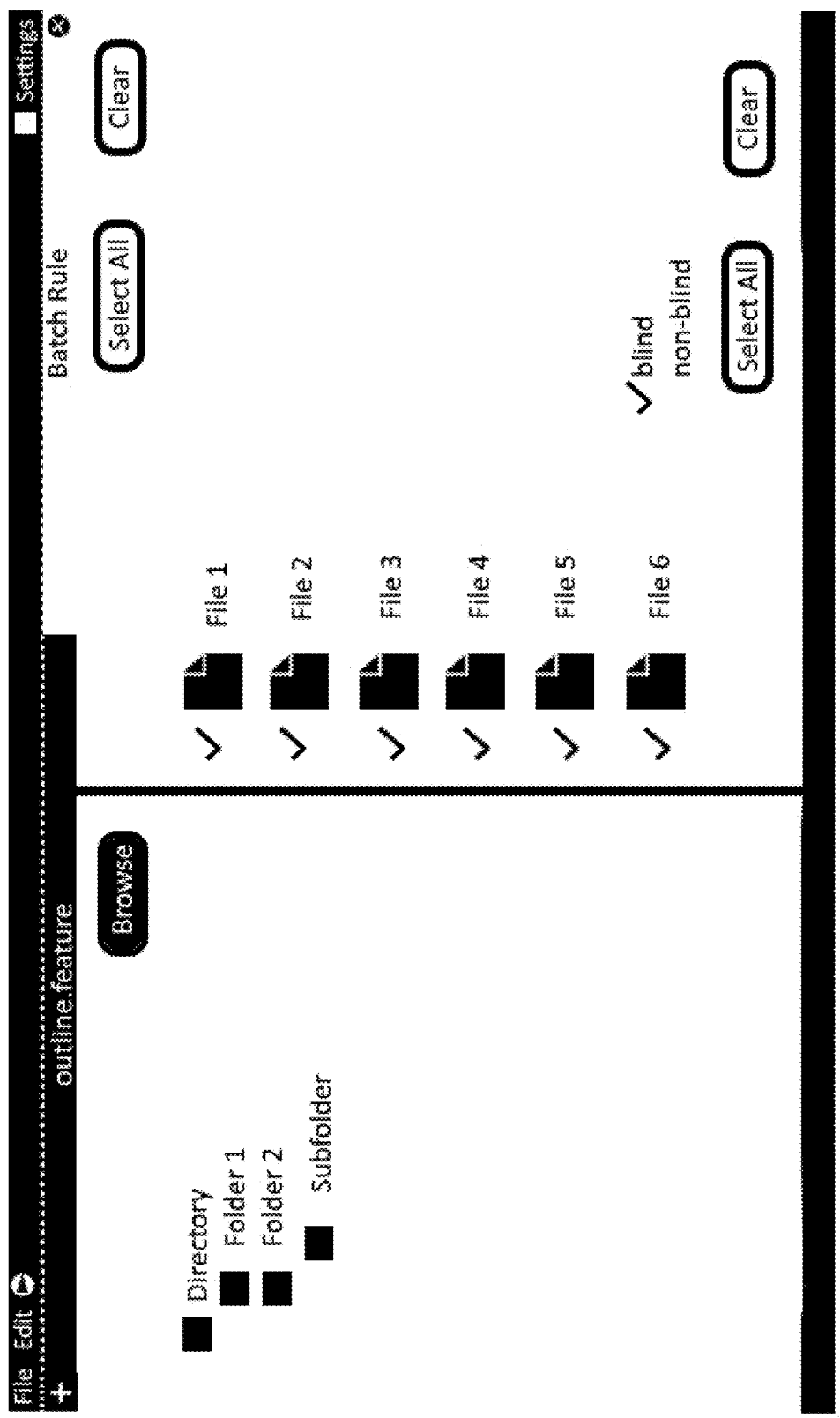
Figure 12:
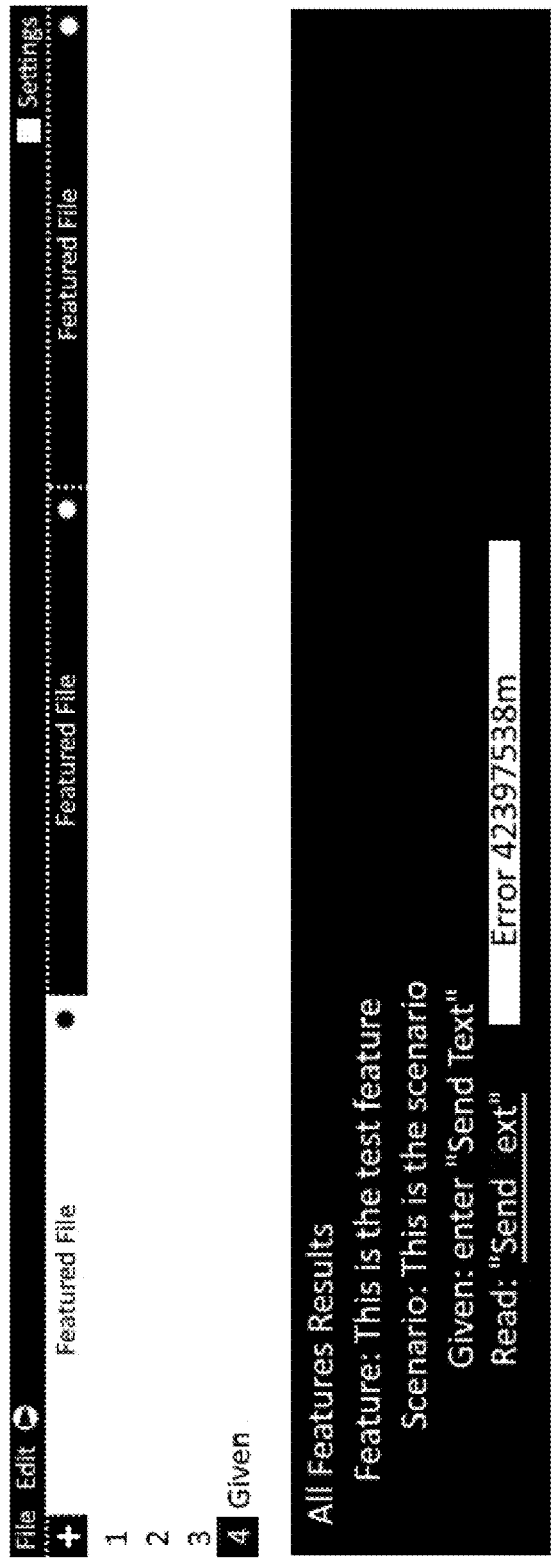
Figure 13:
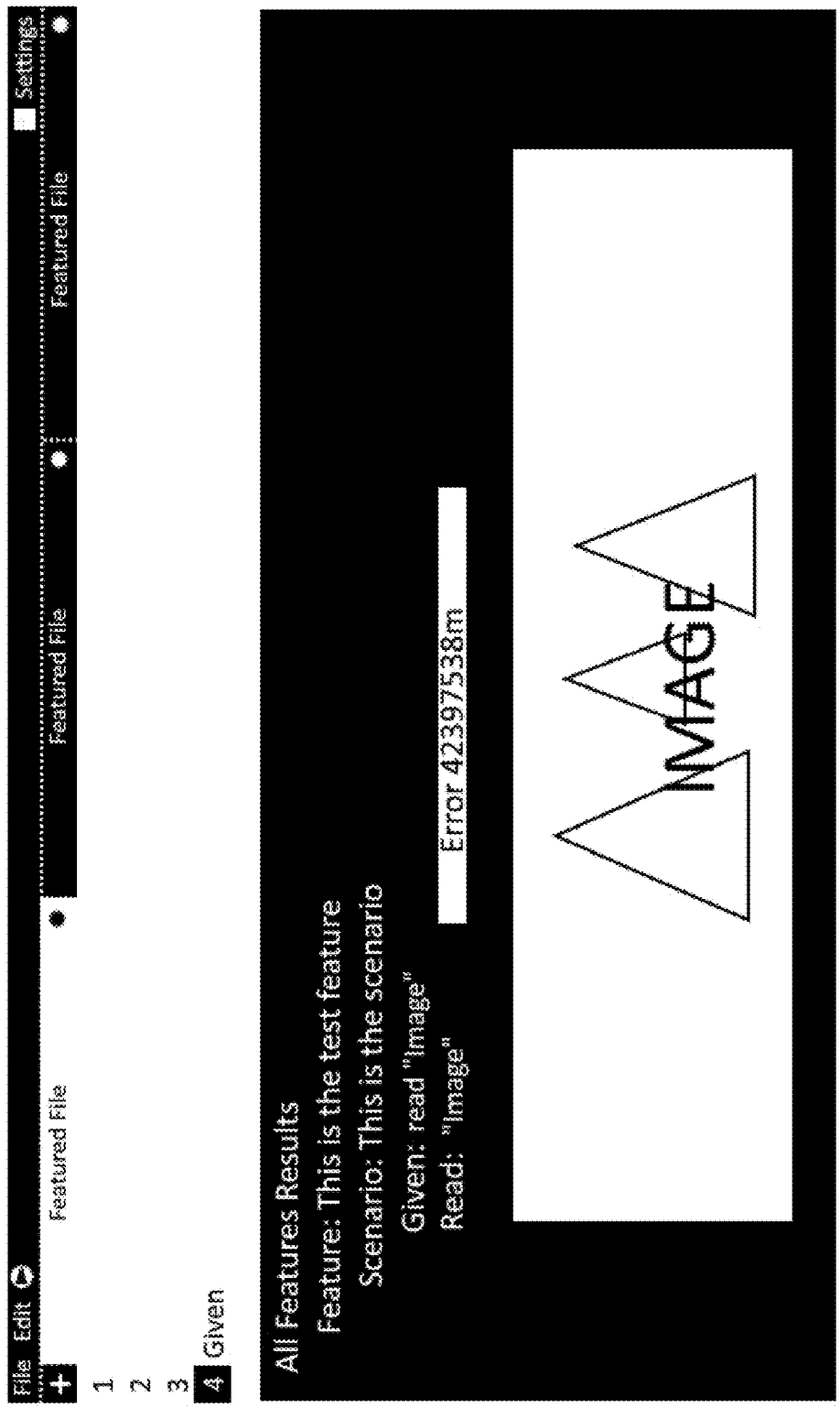
Figure 14:
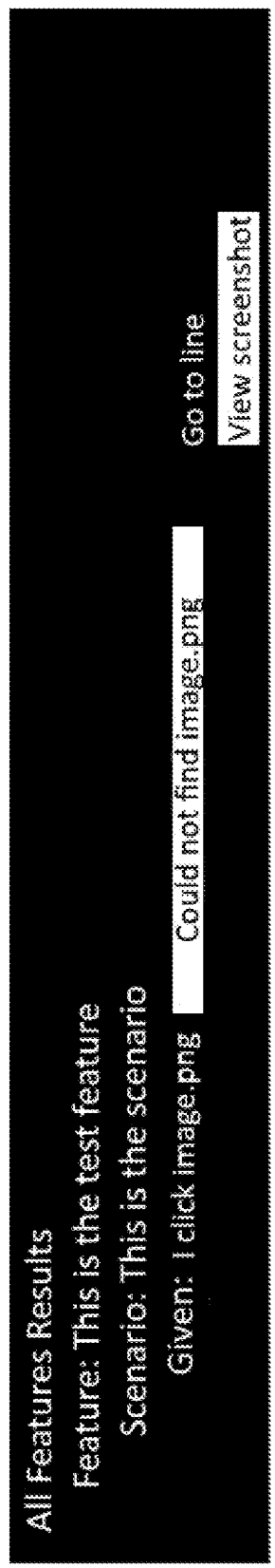
Figure 15:
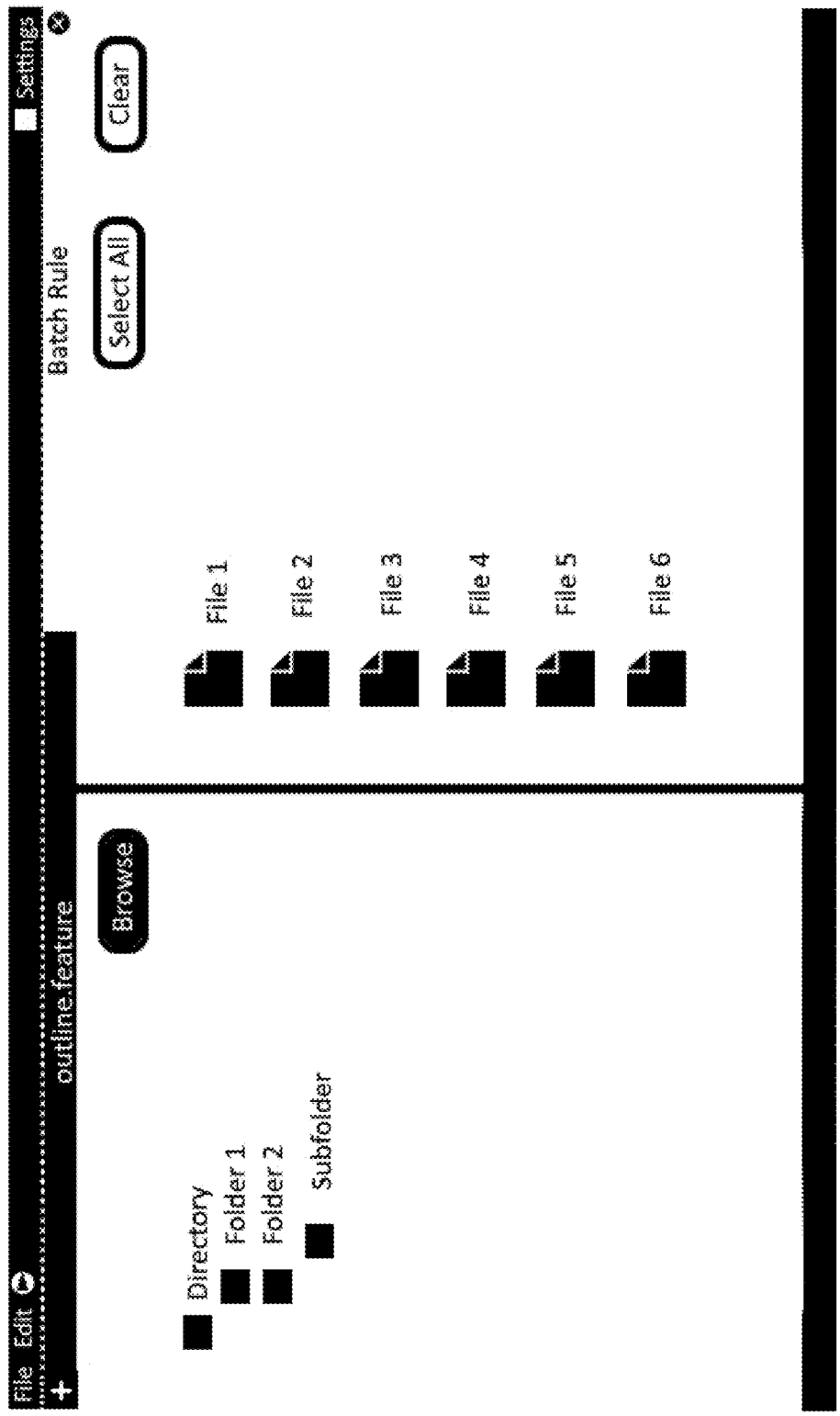

Having thus described embodiments of the invention in general terms, reference will now be made to the accompanying drawings, where:

FIG. 1 is a block diagram of an example system for automated testing of software, in accordance with embodiments of the present invention;

FIG. 2 is a flowchart illustrating a general process flow for constructing a feature file including one or more test scenarios and the organization thereof, in accordance with embodiments of the present invention;

FIG. 3 illustrates a general process flow for performing an automated testing of software using natural language for defining a test scenario, in accordance with embodiments of the present invention;

FIG. 4 illustrates an example GUI for defining a feature file, in accordance with embodiments of the present invention;

FIG. 5 illustrates an example GUI that shows a repeatable Scenario Outline, in accordance with embodiments of the present invention;

FIG. 6 is an example GUI showing a test example, in accordance with embodiments of the present invention;

FIGS. 6a-6b are example GUIs illustrating a prompt and value input, in accordance with embodiments of the present invention;

FIG. 7 is an example GUI illustrating a step that fails to match a step definition, in accordance with embodiments of the present invention;

FIGS. 8-8a are example GUIs illustrating tagging of feature files and/or test scenarios, in accordance with embodiments of the present invention;

FIG. 9 is an example GUI illustrating execution of test scenarios by tags, in accordance with embodiments of the present invention;

FIG. 9a is an example GUI illustrating executing a batch, in accordance with embodiments of the present invention;

FIG. 10 is an example GUI illustrating custom extension generation, in accordance with embodiments of the present invention;

FIG. 11 is an example GUI illustrating executing a test scenario with one or more failures, in accordance with embodiments of the present invention;

FIG. 12 is an example GUI illustrating modifying failed test scripts, in accordance with embodiments of the present invention;

FIG. 13 is an example GUI illustrating an instance of a failed image match, in accordance with embodiments of the present invention;

FIG. 14 is an example GUI illustrating capturing a screenshot of GUI when an error occurs, in accordance with embodiments of the present invention; and FIG. 15 is another example GUI illustrating executing a batch, in accordance with embodiments of the present invention.

DETAILED DESCRIPTION OF THE EMBODIMENTS

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa unless explicitly stated otherwise. Also, as used herein, the term "a" and/or "an" shall mean "one or more," even though the phrase "one or more" is also used herein. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

As will be appreciated by one of ordinary skill in the art in view of this disclosure, the invention may be embodied as an apparatus (including, for example, a system, machine, device, computer program product, or any other apparatus), method (including, for example, a business process, computer-implemented process, or any other process), a system, a computer program product, and/or any combination of the foregoing. Accordingly, embodiments of the invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the invention may take the form of a computer program product having a computer-readable storage medium having computer-executable program code embodied in the medium.

Reference in this specification to "one embodiment" or "an embodiment" means that a particular feature, structure, or characteristic described in connection with the embodiments is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Any suitable computer-readable medium may be utilized. The computer-readable medium may be, for example but not limited to, an electronic, magnetic, optical, electromagnetic, infrared, or semiconductor system, apparatus, or device. For example, in one embodiment, the computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or other tangible optical or magnetic storage device.

Computer-executable program code for carrying out operations of the invention may be written in object oriented, scripted and/or unscripted programming languages such as JAVA™, PERL™, Smalltalk™, C++, SAS™, SQL, or the like. However, the computer-executable program code portions for carrying out operations of the invention may also be written in conventional procedural programming languages, such as the "C" programming language or similar programming languages.

Some embodiments of the invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The computer-executable program code may also be loaded onto a computer or other programmable data processing apparatus to cause a series of operational steps to be performed on the computer or other programmable apparatus to produce a computer-implemented process such that the computer-executable program code which executes on the computer or other programmable apparatus provides steps for implementing the functions/acts specified in the flowchart and/or block diagram block(s). Alternatively, computer-implemented steps or acts may be combined with operator or human implemented steps or acts in order to carry out an embodiment of the invention.

In general, embodiments of the present invention provide a system, computer-implemented method, apparatus, and computer program product for a reliable automated testing of software products in any stage of the product's development and beyond.

In accordance with some embodiments, the present invention provides a number of predefined steps or test scripts that are written in business-readable language or natural language, such as Gherkin, which also allows both technical and non-technical users to understand and write test scripts for testing scenarios in business-readable language or natural language.

Natural language and/or business-readable language, as described in many of the embodiments herein, refers to one or more of ordinary language which arises, often unpremeditated, in the brains of human beings. Typically, these are the languages human beings use to communicate with each other, whether by speech, signing, touch and/or writing. Natural language and/or business-readable language are distinguished from constructed and formal languages such as those used to program computers or to study logic. Thus, natural language and/or business-readable language, in many of the embodiments herein, is different from, independent from, or otherwise not the same as constructed computer programming language. Business-readable language, in some embodiments, is slightly different from natural language because business-readable language may include terms, phrases, and/or wordings that are native a business or business segment and are used when communicating about one or more business-related topics.

The one or more predefined steps, in some embodiments, are standard testing procedures which may be provided with the present invention for the automated testing of software. The one or more predefined steps, in some embodiments, are used together with custom and/or user-generated testing scenarios or test scripts for the automated testing of software applications. Thus, using the predefined steps and/or user-generated steps, the present invention may execute these steps to automatically test software in various manners including, but not limited to, regression testing, implementation testing, system sizing validation, unit testing, and/or the like. These are just some examples of the testing that is accomplished using the present invention and therefore, the present invention should not be limited by these examples.

As mentioned above, the predefined steps and/or test scripts of a given test scenario may be written in a natural language and/or business-readable, domain specific language (such as Gherkin syntax language), which is designed to promote behavior-driven development. Thus, scripting language for the test scenarios of the present invention allows non-technical users or resources to generate or write test scripts without involving technical resources. For instance, a user without prior training or experience with constructed and/or formal computer program languages, such as JAVA or C++, would be able to write a test script in natural language that, when executed, performs one or more tests on a target software application.

In some embodiments, the scripting language of the present invention allows for the use of variables and in-line execution of Open Database Connectivity (ODBC) and JAVA™ Database Connectivity (JDBC) connections and structure query language (SQL) in order to retrieve variable values and also to confirm the results of a test, or for loading data, retrieving variables, checking data, removing data, and/or the like, and much more. In addition to handling SQL connections, the present invention also allows for connections to other software applications, such as MOCA architecture or often a MOCA server (not shown). The present invention may use MOCA connections to allow the in-line execution of MOCA command for either loading data, retrieving variables, checking data, removing data, validating result statuses, and more.

In some embodiments, scripting language of the present invention also has the ability to use control structures, such as IF/ELSE/ELSEIF logic, while-loops, and also comes with a set of predefined step definitions that allow a user to interact with any application through image comparison.

In one embodiment, the present invention uses a proprietary image-matching algorithm that allows for reliable and smooth image matching. Image matching allows the present invention to interact with any application and can be used for testing validation or on-screen mouse placement. Image matching feature of the present invention is a powerful tool for identifying GUI objects or images on a computer that would be otherwise difficult to identify using test scripts. Thus, using image matching and/or comparison tool of the present invention, GUI objects and other images may be identified during the execution of a test scenario for testing, selection, and/or other manipulations (including movement, deletion, de-selection, and/or the like).

Further with respect to the image matching and/or comparison, in some embodiments, the present invention searches for images using a default 1:1 pixel match, but the pixel match tolerance can be adjusted to allow for more or less rigorous matching. For instance, the tolerance for pixel matching can be set to 0.9:1, such that the requirements for matching are less rigorous.

In some preferred embodiments of the present invention, .PNG images as the source image operate at a high level for image matching, as the .PNG format is substantially lossless and contains nearly an exact match of what should be seen. Other formats, such as .jpg or .gif, work with the present invention, as well, however, it has been discovered that .PNG files produce the best results.

In a further preferred embodiment of the present invention, the image matching tool works very reliably when the executing work station is configured exactly like the source workstation for the image, in terms, of operating system (OS), OS theme, and screen resolution.

FIG. 1 illustrates a system environment for the automated testing of software which includes a terminal 101 having a graphical user interface (GUI) 102, a testing server 110 which includes resource directory 112, controller 114, microcomputer 116, and storage device 118. The system environment also includes one or more applications 120, which are the targets of the automated testing of the present invention. The following process flows 200 and 300, discussed below, may be performed a system of terminal 101 or by testing server 110. In some embodiments, the functionality of the terminal 101 and testing server 110 may be combined such that only one system is used to perform testing.

In some embodiments, the terminal 101 and testing server 110 may be connected by a network 144. The network may be a local area network, wide area network, and/or global area network.

The controller 114 includes an emulating/generating unit 130, receiving unit 132, executing unit 134, and determining/deciding unit 136. The controller 114 is comprised by an integrated circuit such as an ASIC (Application Specific Integrated Circuit) or an FPGA (Field Programmable Gate Array). Further, the controller 114 is further realized by causing a CPU (Central Processing Unit) or an MPU (Micro Processing Unit) to execute a program stored in an internal storage device (not illustrated) using the RAM as a work area. The controller 114 realizes or performs the function or operations of information processing to be described herein.

The receiving unit 132 may be part of the controller 114 which performs to receive and/or transmit various kinds of information from and to terminal 101 via the network. The determining/deciding unit 136 of the controller 114 may determine and decide various kinds of information based on information received by the receiving unit. The emulating/generating unit 130 of the controller 114 performs emulations of one or more operations relating to the executing and application of test scenarios to one or more target applications so that the actual operation of each executed step of a test scenario may be displayed via the GUI 102 of the terminal 101. For instance, a user 103 may desire to monitor the operation of a target application to ensure that the test scenario is applied properly. Thus, by using the emulating/generating unit 130, the controller 114 provides a real-time time or substantially real-time display of the application of a test scenario to a target application.

The terminal 101 maybe any type of terminal that is accessible to a user for providing input for testing the software and/or monitoring the software. Thus, the terminal may be a mobile device, laptop, a kiosk, stationary computer, or any other computing device. The terminal 101 includes a display 129. Any graphical user interface (GUI) 102 associated with the testing sever 110 is presented on the display of the terminal 101. The terminal 101 also includes one or more input devices, output devices, such as a speaker 125, or combination input and output devices, collectively I/O device(s) 127. The I/O device(s) include a keyboard, computer pointing device, touch screen, touch pad, or similar devices to control input of information as described herein.

The testing server 110 allows one or more predetermined graphical user interfaces 102 to be presented to a user or tester in order for the user or tester to input data or information into the system or otherwise monitor processes on the GUI 102. The graphical user interfaces 102 may be predetermined and/or presented in response to the user executing one or more tests, such as executing one or more feature files for testing an application on the terminal 101. The predetermined or other graphical user interfaces 102 are generated by the testing server 110 and are presented on the display of the terminal. Graphical user interfaces 102 also include graphical user interfaces that perform various tasks, such as, preparing code and querying databases and/or generating reports and/or responding to prompts.

GUI 102, in some embodiments, present via the display of the terminal one or more simulations of testing sessions which includes a view of the one or more software applications being tested by the present invention.

With more particularity, the terminal 101 generally includes a processor 116 communicably coupled to such devices as a file system 116 which includes a memory, modules/applications 142 which includes a module for initiating electronic communications 120, a module for creating updating and uploading/downloading artifacts 122, applications (e.g., email, instant messaging, warehouse management, or target software applications) 124, user output devices, user input devices, a network interface, a power source, a clock or other timer, and a camera or other image capture device. The processor, and other processors described herein, generally includes circuitry for implementing communication and/or logic functions of the terminal 101. For example, the processor may include a digital signal processor device, a microprocessor device, a controller, and various analog to digital converters, digital to analog converters, and/or other support circuits.

FIG. 2 illustrates a general process flow for constructing a feature file including one or more test scenarios and organizing feature files in accordance with an embodiment of the invention. In embodiments of the present invention, testing scripts are stored in source files (called "Feature Files") with a ".feature" extension. In many embodiments, many feature files should start with a description to provide an overview of the scenarios in a given source file. In some embodiments, the description can be begin with the keyword "Feature:". Feature files, in such embodiments, are the highest level grouping of test scenarios and should be used to group test scenarios that relate together. However, it will be understood, that ".feature" extension and keyword "Feature:" are exemplary and other extensions and keywords may be used to achieve the function thereof. Thus, the present invention is not limited to the fore-mentioned extension or keyword.

Further, in some embodiments, feature files have a single feature defined in them but can have as many scenarios as is applicable. In many of the embodiments of the present invention, syntax highlighting may be implemented to help users draw distinctions between keywords, such as "feature," and other functional or significant aspects of a feature file. As an example, some keywords of the present invention include: Feature, Background, Scenario, Scenario Outline, Examples, Given, And, When, and Then. These keywords can be used to define the functions, features, and/or implement various features of the present invention.

Generally, in embodiments of the present invention, each feature file comprises one or more scenarios, in which scenarios are groupings of steps and often correlate directly with business scenarios. Scenarios, in the present invention, are defined by the keyword "scenario:" and most scenarios will begin with the "Given:" keyword to define the state of the application for each scenario, as shown in FIG. 4.

The keyword Scenario Outline, in embodiments of the invention, allow scripts to repeat a given scenario using different data values defined in the Examples section, as shown in FIG. 5.

The keyword Background, in embodiments of the invention, are similar to scenarios except the steps in a Background are executed before each scenario defined in a given feature file. Backgrounds are often suited for data setup and/or cleanup.

As mentioned above, a scenario comprises one or more steps or a set of steps. In some embodiments, steps should start with one of the defined Gherkin keywords, such as, Given, And, When, and Then, for example. Some of these keywords, in some embodiments, may not have specific functionality tied to them, in terms, of how the present invention parses and uses them but these keywords should be used to ensure the scenarios are written with true behavior-driven development in mind.

With respect to variables, embodiments of the present invention, support storing data in variables for use in feature files. Variables can be defined in a number of ways, such as prompting the user in-line for a value, manually establishing a variable using a step definition or by retrieving data using MOCA or SQL. The ability to store values in variables allows for the creation of dynamic and reusable feature files.

Thus, feature files can be written in a manner such that the user will be prompted for a variable's value and name. In the following example, the step definition will prompt the user for a value to store in the lodnum variable by popping up a dialog with text saying "What load number should be loaded?".

Then I prompt the user for "lodnum" with prompt "What load number should be loaded?"

MOCA results can also be stored in variables for use within a feature file. After establishing a MOCA connection and executing a command, a value can be stored using the following step definition:

When I store row 1 column "stoloc" as variable "my_stoloc"

With the data stored in a variable, using either of the above methods, the variable can be used in any subsequent step within a given Scenario by referencing the variable with the "@" qualifier.

Example:
I enter @my_stoloc
Or
I enter @lodnum

Also, embodiments of the present invention have the ability to use Scenarios as Functions so that a given Scenario can be reused without having to rewrite it each time. Below is an example of using Scenarios as Functions to define a test scenario in a given feature file.

For Example:
Feature: This is an example of using Scenarios as functions
Scenario: Do some fun stuff
Given I do some really fun stuff
Scenario: I should have fun
Given I execute Scenario "Do some fun stuff"
Then I should have had fun Embodiments of the present invention also have the capability to use to use While loops. Below is an example of using a while loop to define a test scenario in a given feature file.

For Example:
Feature: This is a test feature to show how looping and control structures work
Scenario: Empty Work Queue
Given I have an HTTP connection to "example.tryonsolutions.com" logged in as "SUPER" "USER"
While there is work in the work queue
If @oprcod is "PALPCK"
Then I should perform RF picking using the Picking Form
Else If @oprcod is "KITPICK"
Then I should perform Cluster picking using the Pick and Pack GUI
End While Embodiments of the present invention also have the ability to use various control structures, such as, IF/ELSE/ELSEIF structures. Below is an example of using control structures to define a test scenario in a given feature file.

For Example:
Feature: This is a test feature to show how looping and control structures work
Scenario: Empty Work Queue
Given I have an HTTP connection to "example.tryonsolutions.com" logged in as "SUPER" "USER"
While there is work in the work queue
If @oprcod is "PALPCK"
Then I should perform RF picking using the Picking Form
Else If @oprcod is "KITPICK"
Then I should perform Cluster picking using the Pick and Pack GUI
End While In addition, in related embodiments, the present prompts the user for input, such as a value, instead of reading the data from a file, database, or generating the value by the system. For example, when performing integration testing where tests are being repeated for specific scenarios, as exampled in FIG. 6. When test example in FIG. 6 is executed, the system executing the test will prompt the user to enter a value. The prompt may be "What is your name?", as shown in FIGS. 6*a* and 6*b*, such as when a user provides the value, the system may automatically store the value in the variable "name" so that the term "name" can be used as a variable.

Additionally, embodiments of the present invention, easily integrate with other software, such as REDPRAIRIE™, allowing for the execution of MOCA commands directly within a feature file. In embodiments of the present invention, using MOCA commands can be extremely valuable and allows for repeatable data loading/unloading, variable retrievable from other software databases, such as REDPRAIRIE™, data validation using the other software database and countless other useful operations.

In certain embodiments, establishing a MOCA connection is required to support the execution of MOCA commands within a feature file. With an established MOCA connection, executing MOCA commands from within a feature file can be accomplished simply. Thus, a user can use MOCA to create/load data, validate test results, retrieve variables for use in the feature file, and more.

To call a MOCA Command, use the following step definition:

I execute moca command "list printers where wh_id='WMD1'"

This step definition supports any MOCA command as well as executing Local Syntax or piped MOCA commands. Any data retrieved from the execution can be iterated through to a specific row and column and the value can be stored in a variable for use within the feature file. There is also a standard step definition to check the status of the MOCA command for validation purposes.

For example, to check the status of the MOCA Command, use this step definition:

the moca status should be −1403

In addition to allowing execution of any arbitrary MOCA command, step definitions can be defined to allow non-technical users to use MOCA commands without having to understand MOCA. In embodiments of the invention, there are several predefined step definitions that are defined and that include MOCA commands. Thus, these are predefined step definitions that can be used for checking MOCA execution status and as an example, for validating attributes of a given order, validating the location of a given inventory identifier, or even validating the quantity of a given SKU on a given inventory identifier.

For example:

And load "L123" is in location "ABC"

Just like using MOCA, SQL can be used against a non-MOCA environment with the establishment of a SQL connection.

Regarding step definitions, each Step should have an associated Step Definition defined that actually implements the test described by the Step. As previously mentioned the present invention includes a set of predefined Steps and associated Step Definitions. Some of the standard Step Definitions are specific to image comparison, mouse and keyboard manipulation, or even applications and database connections.

Also, embodiments of the present invention are configured to allow for custom extensions. The present invention allows users to write their own Step Definitions, to expand on the standard predefined steps, and to indicate where those definitions are stored so that they can be used by the invention. Once it is indicated to the present invention where the custom step definitions are defined, the related Steps can be used within the present invention just like the standard predefined steps, including syntax highlighting and auto-suggestion.

In another embodiment of the present invention, if the system configured to execute the present invention determines that there is not a match to a given step to a specific step definition, the system will modify the appearance of the step or otherwise apply an indicator for drawing attention to the given step without a match. For instance, the system may underline the step that does not match any step definitions, such as shown in FIG. 7. It will be noted that this is just an example, and the system may modify the non-matching step in any manner including, but not limited to, underlining, highlighting, enlarging, pointing to, and/or a combination thereof or the like.

According to some embodiments, the present invention includes a wide variety of step definitions that should be robust enough for tackling just about any testing scenario. However, the present invention is designed to be completely extendable and allows for end users to design and develop their own custom step definitions alongside the standard set. This allows users to create custom step definitions to suit their specific needs. Extensions need to be packaged into a *.jar format, as shown in FIG. 10, and can be imported into a database of the present invention.

Now, as presented by block 210, the system receives an input or an indication for creating a feature file. As shown by block 220, the system provides a feature file set screen for inputting information for the feature file. The system, at block 230, receives input for establishing the feature file and/or one or more test scenarios. As presented by block 240, once a feature file is created it is stored. At block 250, the system allows for the tagging of feature files and/or test scenarios.

With respect to block 210, the system may receive and input and/or indication for creating or setting up a new feature file in a number of ways including, for example, by receiving an input signal that a user has selected a selectable input feature associated with computer instructions for creating a new feature. Thus, in real terms, a user may simply navigate a mouse or otherwise select a selectable input icon or tab via a graphical user interface of a terminal that, when selected, triggers the computer to provide a setup or new feature file creation screen via a display of the terminal.

At block 220, in some embodiments, the system provides via a GUI of a terminal accessible to the user, one or more portions for receiving input for the feature file. The one or more input portions of the GUI, in some embodiments, includes a first portion for receiving an identification or name of the feature file, a second portion for receiving an identification or name of a scenario included in the feature file, a third portion for receiving input of business-readable or natural language code for performing a test scenario.

Thus, in such embodiments, a user having access to one or more input devices, such as a mouse, microphone, touch panel, keyboard, and/or the like, can use these input devices to enter written input for each of the aforementioned portions of the GUI.

In related embodiments, the user may be able to select from available data, such as, conventional namings for the feature file, conventional namings for the test scenario, and conventional scripts or code to be used in the test scenario.

At block 230, in some embodiments, the system receives the input at the one or more portions of the GUI for establishing the feature file. As mentioned above, the input may include names or identifications for the feature file and/or the test scenario and further include business-readable code for executing a test scenario.

In some embodiments, the present invention is capable of receiving and executing code related to looping and various control structures. Thus, the system may receive input, such as 'While' and/or one or more of 'IF/ESE/ELSEIF' and/or the like to perform looping and other control structures in a particular test scenario.

At block 240, once a feature file has received input, the feature file may be stored in a resource directory or structure database where other feature files and related information are stored. Thus, if a given feature file includes one or more references to files, such as .csv file or jpeg file, the resource directory also includes metadata that points to where that .csv or jpeg file is stored.

At block 250, the system allows for tagging feature files and/or scenarios for organization of feature files and/or scenarios, as shown in FIG. 8. In many embodiments, there is no limit to the number of tags that can be used with a given Feature or Scenario, as illustrated in FIG. 8a. In some embodiments, tags can be created arbitrarily and start with any kind of symbol, such as '@.' It will be understood that both features and scenarios can be tagged for organization. In such embodiments, one or more tags can be associated with each individual feature or scenario such that each feature or scenario can be related to one or more groups of features and/or files having a unique, related tag.

In these embodiments, tags are generally used for grouping together feature files or scenarios that have common themes. For example, in a warehouse environment, it may be helpful to tag all feature files that contain scenarios relating to inventory receiving with "@receiving." In another example, it may be beneficial to tag individual scenarios with a more granular distinction such as "@blind" or "@non-blind" receipt scenarios.

Once feature files or scenarios are tagged, according to an embodiment, the present invention allows execution to be controlled by which tags are marked for execution, and which tags are not marked for execution. As an example, if only blind receiving scenarios should be tested, "@blind" may be selected by a user such that only scenarios tagged as "@blind" are executed, as exampled in FIG. 9. Execution of test scenarios by tags can also be performed via a batch, as illustrated in FIG. 9a and in FIG. 15.

FIG. 3 illustrates a general process flow executing one or more feature files and/or scenarios for testing software, in accordance with embodiments of the present invention.

Beginning in block 310, the system allows a user and/or for the automatic selection of one or more scenarios and/or feature files to be executed for testing one or more software applications and/or the like. For instance, the system may allow the user to select one or more predefined step definitions, which may be directed to tests related to image comparison, testing or establishing applications and database connections, and/or for emulating keyboard, mouse, or other input device manipulations. In such instances, a specific or dedicated location for these predefined step definitions is provided, such that by either selecting a dedicated selectable input feature, such as a GUI icon, triggers the population of all available predefined step definitions.

In addition to or separate from the predefined step definitions, the system may allow the user to access the resource direction and/or a related GUI having access to the resource directory. Using the GUI having access to the resource directory, a user may make a selection of one or more individual feature files and/or scenarios. Thus, some embodiments, the user may establish a test case which includes a combination of predefined step definitions and user-generated step definitions, feature files, and/or scenarios.

In some embodiments, the resource direction must be defined to enable the image matching or comparison functionality and also to use step definitions that rely on *.csv, *.sql, or *.msql files. For instance, path names, in a feature file, for specific assets should be written in relation to the defined resource directory.

Selections by the user may also be made by selecting and/or identifying batches of step definitions, scenarios, and/or features for executing. For instance, embodiments of the present invention allow for the execution of feature files and/or step definitions in batches. In such embodiments, the present invention comprises a batch run feature that, when selected, points to a specific directory containing a batch of feature files and/or step definitions. Thus, a user may select one or more specific directories, where each directory is associated with a batch of feature files and the like. A batch may include two or more related or unrelated feature files, scenarios, and/or step definitions. Within each batch or separate from a batch, files may be selected or deselected individually or using a select all feature or clear all feature of the present invention.

The selected files and/or batches will be executed by a controller or processor of the present invention. In some embodiments, the selected files and/or batches are executed synchronously, such that the files and/or batches are executed at the same time or substantially the same time (e.g., within moments of each other). In another embodiment, the selected files and/or batches are executed sequentially and/or in a combination of sequentially and synchronously executed.

In block 320, the system is configured to execute the selected feature files and/or selected batches based on receiving an execution signal. For example, after selecting one or more batches for testing a software application, a user can selected an selectable GUI object, such as "Execution" button, that when selected, automatically triggers the execution of the one or more batches selected by the user.

Prior to execution of the selected feature files and/or selected batches, the system allows for input of one or more parameters for controlling the execution of the selected feature files and/or selected batches. For instance, in one embodiment, the system allows the During the execution process, in block 330, the system may provide and/or otherwise produce, via a number of output devices, information relating to the execution of one or more feature files and/or one or more batches. In some embodiments, the output devices include a display of a terminal on which a user provides inputs and commands for testing the software applications. In such an embodiment, the system may provide via the display a combination of results, passes, failures, reporting, and even emulate actions associated with input devices, such as a keyboard and mouse, as shown by FIG. 11.

With respect to displaying results of the execution, in some embodiments, contemporaneous (e.g., prior to, during, and/or immediately following) with the execution of feature files and/or the like, the controller of the present invention provides to a first portion of the display of a user's terminal, execution information relating to the execution of the feature files. Thus, in such embodiments, the results portion of the displays execution information including, but not limited to, displaying a copy of the information within a feature file that is being executed or that was executed by the controller, the scripts of code that were executed successfully or that were not executed successfully, and reporting associated with the execution of the feature file. For instance, as shown in FIG. 11, the results portion shows that the Feature: This is a test feature file was executed successfully. In such an instance, the system provides an indicator of a successful execution of the Feature and similarly, provides an indicator, as shown for example, in FIG. 12, of a failure in the code associated with the feature file. As an example, an example of an indicator of successful execution of a feature file may be displaying the code of the feature file in green (or otherwise highlighting the feature file). Continuing with this example, the system displays the failing code or script of a feature file in red, such that the words, numbers, and/or symbols comprising the script are in green. According to this example, a user can easily identify successful and unsuccessful code in the results portion because of the contrast in the color of the code. It will be understood that this is just an example of an indicator for a successful and/or unsuccessful execution of the code or script in a feature file and the system may indicate a successful or unsuccessful code or script in any number of ways including, but not limited to, by underlining the code or script, pointing to the code or script, making comparatively larger the successful code or script (e.g., failing code is made larger than passing code), flashing the code or script, animating the code or script, and/or otherwise modifying the appearance of the code or script to bring attention thereto.

In particular, in accordance with some embodiments, as exampled in FIG. 12, when an error or failure occurs in the execution of the code or script of a feature file, the results portion displays a modified version of the failed code or script and a corresponding error message or information which identifies the error in the execution of the code or script of the feature file or some error with some other aspect of the feature file. For example, the system may underline the failed code, as illustrated in FIG. 12, and further indicate that there is not a matching step definition for the specific language or code used in the feature file.

In a second portion of the GUI, the system provides the content of the feature file that is to be executed, that is being executed, or that was executed by the controller or microcomputer of the present invention. In some embodiments, the system when the execution of the feature file or a part thereof is unsuccessful, the system modifies the code or script within the second portion of the GUI. Thus, in such embodiments, the system may modify in one or both of the first or second portion (e.g., results portion) of the GUI. It will be understood that the first portion and the second portion separate and distinct from each and may provide similar and/or different information from each other.

In some embodiments, the system displays additional information about failed code by hovering over or selecting either the failed code or a corresponding error message. By hovering over or selecting the failed code, the system provides additional or similar information regarding the failure of the code or script of the feature file. For instance, when looking for a specific image based on the execution of script or code in a feature file, if the system cannot find the image identified in the code, by hovering or selecting the error message associated with the failed code, the system will display in the results portion (or any other portion of the GUI) an image of what the system was searching for when the associated code was executed, as shown in FIG. 13.

As mentioned briefly in block 340, using a controller and/or a processing device, the system emulates or otherwise simulates the interaction between one or more input components associated with a terminal and the application or software programs being tested. In this way, as one or more feature files are executed by the system, one or more actions by input devices corresponding to executed code are simulated and displayed by the system. Thus, a user or tester can ensure that the test scenario(s) of the executed one or more feature files is operating according to the step definitions therein.

For instance, in some embodiments, the system displays a results portion (e.g., a first portion), second portion (describing the feature files for execution), and/or the simulation of the execution of the feature files. In such embodiments, a user or tester can view, at the same time and via the display, the results portion, the second portion, and the simulation of the execution of the feature files. Thus, when an error is identified in the results portion, a user can view at what point in the simulation the error occurred, as well as the feature file(s) and associated code being executed in the second portion thereby obtaining several perspectives for identifying and resolving the error.

In addition, in some embodiments, upon the occurrence of an error, such as the failed execution of code or other issue with the testing, the system records information associated with the execution or failed execution of the code. For instance, the system may determine an error based on a failed execution of one or more feature files or the like. In such an instance, the system captures, via an image capture device or method, a screenshot of content and/or images being displayed on a terminal associated with the testing at the time the failure occurred, as disclosed by FIG. 14. Thus, the content that was displayed on the GUI at the time the error occurred may be viewable via the screenshot. A screenshot may include any form of screen capture (or screen-cap), screen dump, screengrab, or the like for recording visible items displayed on a display of a terminal, or another visual output device.

The image capture device or method may include a number or devices or methods including, but not limited to, a digital image using the operating system or software running on the computer, a camera, or a device intercepting the video output of an output device, such as a display.

At block 350, an additional process the system executes, includes image comparison that is used at least for determining the existence or non-existence of an image during scenario testing. In some instances, once the existence of an image is determined, the system may select, deselect, or otherwise manipulate the image.

For example, according to embodiments of the present invention, a user may define a feature file to include one or more steps for selecting an icon or a selectable input feature in a test scenario. In such an example, the icon may be an icon for opening a web browser. The system while executing the feature file may identifying a step that requires determining whether the icon for the web browser exists and further selecting the web browser icon for opening a web browser page or window. In performing this step, the system may obtain a stored image associated with the step in the feature file and compare the stored image to one or more images accessible on a GUI to determine whether or not there is a match between the stored image and an image on the GUI. If the system determines that there is a stored image, then the system may proceed to select the GUI object or icon on the GUI that matches the stored image for fulfilling the step of selecting the web browser icon and opening a web browser page.

In some embodiments of the present invention, using the present invention, a tolerance level or degree to which an image on a GUI must match an image referenced in a feature file can be varied. In such embodiments, matching is performed on a pixel-by-pixel basis and the match tolerance can be raised or lowered in order to allow for more or less rigorous matching. Raising the tolerance can help account for false negatives due to resolution settings, operating system themes, and other system environment factors.

In some embodiments, the tolerance level for matching is at a set default level. In the present invention, an optimal tolerance value is set such that the best combination of matching reliability and system performance is achieved.

Other features may be enabled to optimize the execution of a test, in some embodiments. For instance, according to embodiments of the present invention, the system provides fail fast feature that will halt execution of one or more feature files after a predetermined number of failures or errors. In such embodiments, a predetermined numbers of failures may be present by a tester or user, which act as an upper threshold for triggered the automatic stop of the execution of one or more feature files. On the other hand, for large regression tests or execution of one or more batches, turning off the fail fast setting will allow the system of the present invention to progress through an entire test set, irrespective of failures.

As another feature for controlling the execution of one or more test scenarios, embodiments of the present invention are configured to receive input relating to a step delay. For instance, in such embodiments, a time delay can be added between step executions. As an example, input of a timing delay for delaying an execution by the controller of a successive step in the plurality of steps in the natural language testing scenario, such that between an n step and an n+1 step, the n+1 step is executed by the controller only after a time period associated with the input of the timing delay has expired. In this way, if test scenarios and their corresponding emulations are being used for training purposes, the execution of the steps can be modified to be slower for appropriate training using the associated emulations. Thus, increasing a step delay feature of the present invention will pause execution for the defined period of time between each step in a feature file. As mentioned above, this slows down execution speed, allowing users to watch the present invention perform the tests at an understandable pace. Accordingly, the step delay setting can be used to slow down emulations and executions of the present invention for training purposes.

For convenience of a tester or user, in some embodiments, the system provides a number of most recent feature files that have been used, referenced, and/or executed. A user or tester can adjust the number of recent feature files according to his preference.

At block 360, either upon completion, termination, or during an execution of a test scenario, the system may cause a report generator to generate a report providing details of the testing of the target software application. In some embodiments, the report comprises errors and/or failures of a test scenario or one or more steps in a test scenario, a length of time of the test, the information and/or metrics on the errors and/or failures of the test scenario, and various additional information relating to the execution and performance of the test scenario.

In addition, the apparatus and/or system configured to perform the process flows 200 and 300 can be configured to perform any of the portions of process flow 200 and 300 represented by blocks 210-250 and 310-360 or any other embodiments described herein upon or after one or more triggering events (which, in some embodiments, is one or more of the other portions of process flows 200 and/or 300). As used herein, a "triggering event" refers to an event that automatically (i.e., without human intervention) triggers the execution, performance, and/or implementation of a triggered action, either immediately, nearly immediately, or sometime after (e.g., within minutes, etc.) the occurrence of the triggering event. For example, in some embodiments, the system configured to perform the process flow 300 is configured such that the system performing the execution of the feature files (the triggering event) automatically and immediately or nearly immediately (e.g., within 1-30 second, and/or the like) triggers the system to emulate the operation of the tests applied to the target software (the triggered action). Further in addition, it will also be understood that the system or apparatus having process flows 200 and/or 300 can be configured to perform one or more portions of the process flows 200 and/or 300 in real-time, in substantially real-time, and/or at one or more predetermined times. In some embodiments, one or more portions of process flows 200 and/or 300 are performed in substantially real-time when there is a delay between an execution of a scenario and an emulation and/or otherwise performance of the executed scenario. For instance, the system configured to perform the process flow 300 is configured such that upon execution of a testing scenario for sending an email through an email application, the system may execute the natural language of the testing scenario anywhere from 2-5 seconds prior to an emulation of sending an email through the email application is displayed on a display of the terminal. In this case, since there noticeable or quantifiable time delay, such as a 2-5 second, between execution of the natural language and emulation of the test scenario, the emulation is performed in substantially real-time. It will be understood that this is just an example and the time delay for determining that a function or portion of a process flow described herein is not fixed to 2-5 seconds but may vary and it may depend on the scenario and other factors that determine whether a function is performed in real-time or substantially real-time.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for testing a computing device, the system comprising:
   a display;
   a testing application maintained on a storage device;
   a controller that is capable of controlling to execute the testing application to test the computing device, the controller comprising a microprocessor,
   wherein the controller is in operable communication with the computing device and the display, wherein the controller controls to:
   execute one or more testing scenarios;
   emulate a performance of work by a plurality of virtual work-performing devices based on the one or more testing scenarios wherein each of the virtual work-performing devices applies a load onto the computing device; and provide, via the display, a visual representation of each of the plurality of virtual work-performing devices during the testing of the computing device, wherein the controller further controls to generate a graphical user interface for implementing the test of the computing device, wherein the graphical user interface comprises:

an emulation section that emulates a performance of work by the plurality of virtual work-performing devices;

a monitoring section that monitors the performance of work by the plurality of virtual work-performing devices; and a batch section that includes one or more batches of different test scenarios being executed by the plurality of work-performing devices that is capable of being emulated in the emulation section and monitored in the monitoring section, wherein:

the emulation section is selectable, wherein when selected, populates via the display the visual representation of each of the plurality of virtual work-performing devices that is applying the load to the computing device during the test; the monitoring section is selectable, wherein when selected, populates i) a section having a unique identifier for each of the plurality of virtual work-performing devices that is applying a load to the computing device and ii) a corresponding section that includes a current step of a test scenario being performed by each of the virtual work-performing devices and a previous step of the test scenario which was performed by each of the virtual work-performing devices at a time earlier; and the batch section includes one or more selectable batches, wherein when selected, enables to the emulation section and the monitoring section to populate data associated therewith, wherein each of the one or more selectable batch sections relates to a different one of the one or more test scenarios being executed by at least a portion of the plurality of virtual work-performing devices;

wherein each of the one or more testing scenarios comprises controller-executable scripts written in natural language which define one or more tasks to be performed by at least the plurality of virtual work-performing devices when each test scenario is executed by the controller, and wherein the controller further controls to execute the natural language scripts of the one or more testing scenarios in order to simulate or emulate the performance of work by the plurality of virtual work-performing devices.

2. The system according to claim 1, wherein each of the visual representations for each of the plurality of virtual work-performing devices is a selectable computer-generated image, wherein when the visual representation is selected, allows for a modification, by a user, of the tasks being performed by the corresponding virtual work-performing device while the controller is performing the testing of the computing device.

3. The system according to claim 1, wherein each of the plurality of virtual work-performing devices is a selectable graphical user interface object that when selected allows for a manipulation of the virtual work-performing device.

4. The system according to claim 1, wherein each of the plurality of virtual work-performing devices is identified by a unique identifier wherein each of the visual representations corresponding to each of the plurality of virtual work-performing devices is also identifiable by the unique identifier.

5. The system according to claim 1, wherein the visual representation provided via the display for each of the plurality of virtual work-performing devices includes a portion therein that provides an user interface that changes according to one or more tasks being performed by the virtual work-performing device during testing of the computing device.

6. The system according to claim 1, wherein at least some of the plurality of virtual work-performing devices comprise a virtual radio frequency (RF) scanner which is configured to perform one or more tasks associated with inventory management or supply chain management.

7. The system according to claim 1, further comprising:
a testing device that is in operable communication with the controller for implementing the testing of the computing device, wherein the testing device using the controller establishes a direct telnet session with the computing device without using a separate telnet application.

8. A system for testing a computing device, the system comprising:

a display;

a testing application maintained on a storage device;

a controller that is capable of controlling to execute the testing application to test the computing device, the controller comprising a microprocessor, wherein the controller is in operable communication with the computing device and the display, wherein the controller controls to:

execute one or more testing scenarios;

emulate a performance of work by a plurality of virtual work-performing devices based on the one or more testing scenarios wherein each of the virtual work-performing devices applies a load onto the computing device; and provide, via the display, a visual representation of each of the plurality of virtual work-performing devices during the testing of the computing device, wherein the controller controls to execute a two or more batches of testing scenarios, wherein a first batch of the two or more batches comprises a first testing scenario for performing a first task by a first portion of the plurality of virtual work-performing devices and a second batch of the two or more batches comprises a second testing scenario for performing a second task by a second portion of the plurality of virtual work-performing devices, the first batch being different from the second;

wherein each of the one or more testing scenarios comprises controller-executable scripts written in natural language which define one or more tasks to be performed by at least the plurality of virtual work-performing devices when each test scenario is executed by the controller, and wherein the controller further controls to execute the natural language scripts of the one or more testing scenarios in order to simulate or emulate the performance of work by the plurality of virtual work-performing devices.

* * * * *